June 21, 1949.  G. ALBRIGHT  2,474,085
TRACTOR DRIVE MECHANISM
Filed Feb. 13, 1946
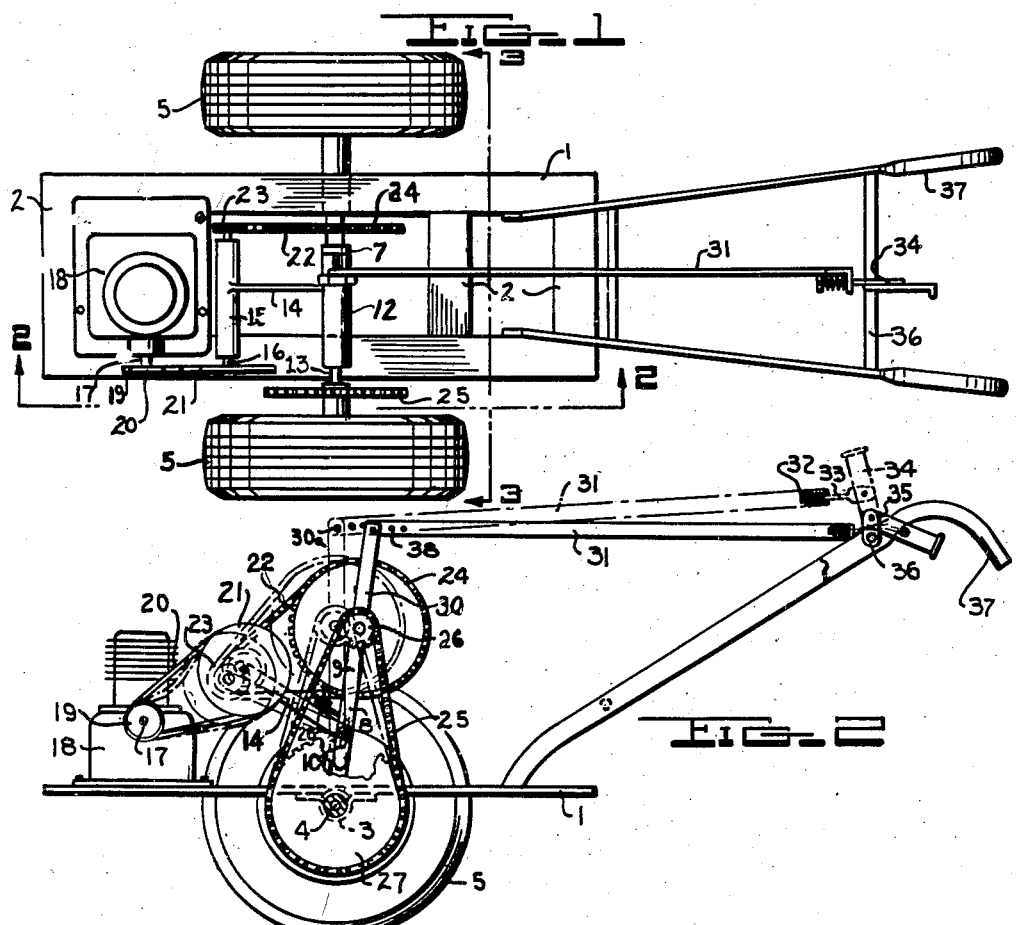
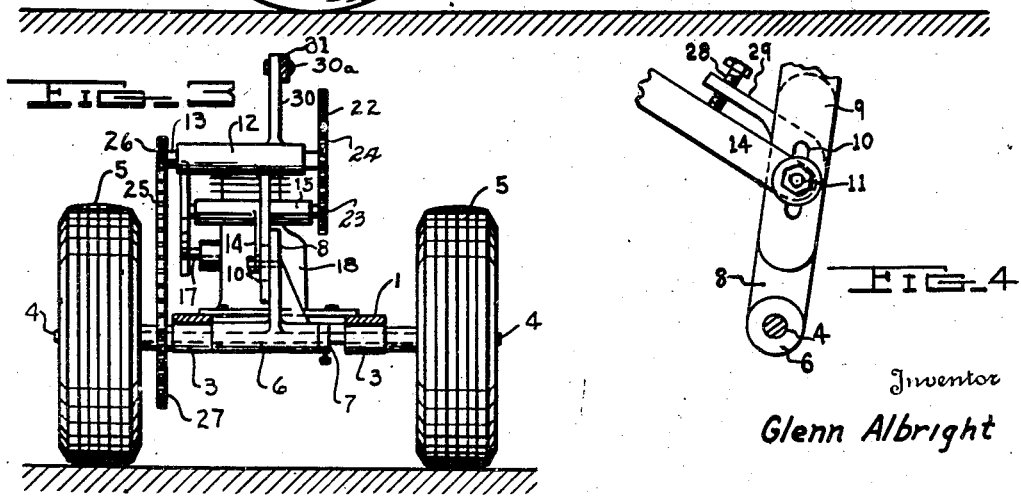
Inventor
Glenn Albright
By J. S. Murray
Attorney Patented June 21, 1949

2,474,085

UNITED STATES PATENT OFFICE 2,474,085

TRACTOR DRIVE MECHANISM

Glenn Albright, Detroit, Mich.

Application February 13, 1946, Serial No. 647,232

2 Claims. (Cl. 180—70)

1

This invention relates to drive mechanisms and particularly mechanisms for driving small vehicles such as garden tractors.

It has been recognized as advantageous, in small power-driven vehicles requiring intermittent discontinuance of the drive, to derive a clutch function from a transmission belt by shifting one of the belt pulleys to and from the other, whereby the belt is adapted to either slip or drive. Mechanisms heretofore employed for such purpose, however, have required a shortening of the belt from time to time in compensation for stretching due to use and weathering. In other words, the pulley which has been movable in prior mechanism to tighten or slacken the belt has been limited as to its movement by reason of the drive connection from such pulley to the traction wheel or wheels of the vehicle.

An object of the invention is to provide a vehicle drive mechanism including a belt, and to adapt one of the belt pulleys to be shifted for tightening or slacking the belt, without interfering with the drive from such pulley to the traction wheel or wheels of the vehicle.

Another object is to adapt the movable pulley to be held in any of its positions of use in a novel manner.

Another object is to provide an engine-propelled vehicle of the type having a pair of handles for steering and guiding the vehicle, and to include in the drive to the vehicle wheels a belt which may be tightened or slackened to establish or discontinue the drive, and to provide in a novel manner for controlling said belt from a point adjacent to said handles.

These and various other objects are attained by the construction hereinafter described and illustrated in the accompanying drawing, wherein:

Fig. 1 is a top plan view of a tractor equipped with my improved drive mechanism.

Fig. 2 is a longitudinal vertical sectional view, taken on the line 2—2 of Fig. 1.

Fig. 3 is a cross sectional view taken on the line 3—3 of Fig. 1.

Fig. 4 is a fragmentary enlargement of a portion of Fig. 2, particularly showing an adjustable stop.

In these views, the reference character 1 designates the sills or side bars of an elongated rectangular frame having cross bars 2. Secured to the members 1 therebeneath are a pair of bearings 3 receiving an axle 4. At opposite sides of the frame 1, 2 the axle is mounted by and drives a pair of traction wheels 5. A sleeve 6, mounted to rock on the axle between the frame members

2

1, is held by a set collar 7 against one of said members, being thus restrained from sliding. Integrally upstanding from the sleeve 6 is an arm 8 to which is bolted an upward extension 9. Said extension is longitudinally slotted as indicated at 10 to receive a bolt 11 carried by the arm 8, whereby the length of the lever jointly formed by said arm and extension may be regulated. The extension 9 is surmounted by a bearing 12 journaling a shaft 13 parallel to the axle. Clamped to the arm 8 is an arm 14 projecting forwardly of the vehicle at an upward inclination and formed at its front end with a bearing 15, journaling a shaft 16 parallel to the axle.

The shaft 17 of an engine 18 mounted on the front portion of the frame 1, 2 carries a pulley 19 from which a belt 20 drives (at a reduced speed) a larger pulley 21 on the shaft 16. Another speed-reducing drive is established from the shaft 17 to the shaft 13 through a chain 22 carried by sprocket wheels 23 and 24, and the axle 4 is driven from the shaft 13 through a chain 25 and sprocket wheels 26 and 27 effecting a further speed reduction. Regulable length of the lever formed by the arm 8 and its extension 9 permits regulation of the tension of the chain 25, and the angular relation of the arm 14 to the arm 8 may be varied to properly tension the chain 22. The angular position of the arm 14 is determined by its engagement with a stop-forming screw 28, mounted in a lug 29 fixed on and forwardly projecting from the arm 8.

Describing now a provision for regulably tensioning the belt 20, the bearing 12 rigidly carries an upstanding arm 30, to which is pivoted by a pin 30a the forward end of an elongated link bar 31. Clamped to the rear end of said bar by nuts 32 is a bolt 33 pivoted to a handle 34 and a coiled spring 34a is compressed between said nuts and the transversely bent rear end of the link 31. The handle is pivoted for forward and back swinging on a lug 35 rigidly upstanding from a cross bar 36. Said cross bar rigidly interconnects the rear end portions of a pair of handle-forming bars 37 serving to guide and steer the tractor and extended divergently rearwardly and upwardly from the frame 1, 2. The effective length of the link bar 31 may be varied by either shifting the nuts 32 on the bolt 33 or by selection of any of several holes 38 formed in the link bar to receive the pin 30a, or both adjustments may be used.

In use of the described control for the belt 20, the latter is sufficiently tightened to transmit a drive when the handle 34 is lowered as shown in full lines in Fig. 2, the corresponding position of the drive mechanism being also shown in full lines. When the handle is shifted to its forward position, the lever 8, 9, 30 is swung sufficiently forward to produce a non-driving slackness in the belt, all as shown in dash lines in Fig. 2. It will be noted that the point of engagement of the bolt 33 with the handle 34 is so downwardly shifted in tightening the belt that tension induced in the link bar 31 is effective to retain said handle in driving position. Swinging of the handle 34 to its downwardly extending belt-tightening position imposes a compression on the spring 34a, tending to maintain such position. The variable effective length of the link bar is useful in compensating for stretching of the belt, this requiring a considerable increase in the distance between the two pulleys, when the belt is old, as compared to that required by a new belt.

A most important feature of the described control mechanism lies in avoidance of any disturbance of the two chain drives. There can be no such disturbance, since the transmission elements driven by the belt are all mounted on the lever 8, 9, 30, and the latter swings about the axle, maintaining a constant relation of said elements to the axle. There is hence no limitation on swinging of said lever and it may be shifted adequately to tighten the belt, even when excessively stretched. An important saving of time results, in that there is no need for intermittently shortening and resplicing the belt as has heretofore been necessary.

What I claim is:

1. In a vehicle drive mechanism, a frame, a power plant mounted on said frame, a traction wheel supporting the frame, an arm upstanding from and pivoted substantially at the axis of the traction wheel, a second arm pivoted on and forwardly extending from the first-mentioned arm, a shaft journaled on the forward portion of the second arm, a driven pulley on said shaft, a driving pulley mounted on and driven by the power plant, a belt forming a drive connection from the driving pulley to the driven pulley, a shaft journaled on said upstanding arm, a chain establishing a drive to the last-mentioned shaft from the first mentioned shaft, a chain establishing a drive from said chain-driven shaft to the traction wheel, means for regulating the length of said upstanding arm to adjust the tension of the last-mentioned chain, means for pivotally adjusting said upstanding arm to regulate the tension of said belt, and means for pivotally adjusting said forwardly projecting arm to regulate the tension of the first-mentioned chain.

2. In a vehicle drive mechanism, a frame, a power plant mounted on said frame, a traction wheel supporting the frame, an arm upstanding from and pivoted substantially at the axis of the traction wheel, a second arm pivoted on and forwardly extended from said upstanding arm, a driven pulley journaled on the forward portion of the forwardly projecting arm, a driving pulley mounted on and driven by the power plant, a belt forming a drive connection from the driving to the driven pulley, a rotary drive element coaxial with and driven by said driven pulley, a rotary driven element mounted on said upstanding arm, a flexible drive connection from said rotary driving element to said rotary driven element, means for selectively varying the angular relation of said arms to regulate the tension of said flexible drive connection, means for adjusting said upstanding arm about its pivotal end to vary the tension of said belt, and a drive connection from the rotary driven element to the traction wheel.

GLENN ALBRIGHT.

REFERENCES CITED

The following references are of record in the file of this patent:

UNITED STATES PATENTS

| Number | Name | Date |
|---|---|---|
| 2,066,174 | Cregier | Dec. 29, 1936 |
| 2,069,245 | Haines | Feb. 2, 1937 |
| 2,070,288 | Mack | Feb. 9, 1937 |